United States Patent
Gerhardt et al.

[11] Patent Number: 5,984,231
[45] Date of Patent: Nov. 16, 1999

[54] AIRCRAFT WITH VARIABLE FORWARD-SWEEP WING

[75] Inventors: Heinz A. Gerhardt, Redondo Beach; Kenneth Seho, Garden Grove, both of Calif.; Joan Nolan, Laurel, Md.; Matthew N. Mrdeza, Whittier, Calif.

[73] Assignee: Northrop Grumman Corporation, Los Angeles, Calif.

[21] Appl. No.: 09/100,738

[22] Filed: Jun. 19, 1998

[51] Int. Cl.⁶ .................................................. B64C 3/40
[52] U.S. Cl. ............................................. 244/46; 244/49
[58] Field of Search .................... 244/45 R, 46, 244/49

[56] References Cited

U.S. PATENT DOCUMENTS

| | | | |
|---|---|---|---|
| D. 231,094 | 4/1974 | Schmidt | D12/78 |
| D. 268,107 | 3/1983 | Enav et al. | D12/331 |
| D. 332,080 | 12/1992 | Sandusky, Jr. et al. | D12/342 |
| D. 356,990 | 4/1995 | Weir et al. | D12/342 |
| 2,293,644 | 8/1942 | Gluhareff | 244/13 |
| 3,045,953 | 7/1962 | Eggers et al. | 244/52 |
| 3,121,312 | 2/1964 | Hopper | 60/35.54 |
| 3,414,195 | 12/1968 | Saunders | 239/11 |
| 3,489,375 | 1/1970 | Tracy | 244/46 |
| 3,684,217 | 8/1972 | Kukon et al. | 244/36 |
| 3,743,218 | 7/1973 | Sweeney et al. | 244/36 |
| 4,093,156 | 6/1978 | Coe, Jr. | 244/45 |
| 4,569,493 | 2/1986 | Burhans, Jr. | 244/76 |
| 4,767,083 | 8/1988 | Koenig et al. | 244/12.3 |
| 4,828,203 | 5/1989 | Clifton et al. | 244/12.3 |
| 4,836,470 | 6/1989 | Criswell | 244/2 |
| 4,998,689 | 3/1991 | Woodcock | 244/46 |
| 5,170,964 | 12/1992 | Enderle et al. | 244/52 |
| 5,320,305 | 6/1994 | Oatway et al. | 244/12.3 |
| 5,538,201 | 7/1996 | Gerhardt | 244/204 |

*Primary Examiner*—Galen L. Barefoot
*Attorney, Agent, or Firm*—Terry J. Anderson; Karl J. Hoch, Jr.

[57] ABSTRACT

An aircraft with a variable forward-sweep wing and the method of configuring the wing in an optimal position for a desired flight regime. The variable forward-sweep wing is positionable from an essentially unswept position to a full-forward sweep position. In the unswept position the wing is approximately orthogonal to a fuselage centerline, while in the full-forward sweep position the wing has approximately a delta wing planform. Moreover, as the wing position changes from the unswept position to the full-forward sweep position the trailing edge becomes the leading edge. In addition, the aforementioned apparatus may be used in a method to configure the aircraft for flight in a desired flight regime. This method includes moving the wing to an optimal position for the desired flight regime.

70 Claims, 2 Drawing Sheets

AIRCRAFT WITH VARIABLE FORWARD-SWEEP WING

BACKGROUND OF THE INVENTION

1. Field of the Invention

The present invention relates in general to aircraft and more particularly to an aircraft that includes a variable forward-sweep wing.

2. Background Art

Modern military aircraft must be versatile. Typically, the same aircraft may be required to act as a bomber aircraft and deliver a large weapons payload to an enemy target while in the next mission be required to assume a fighter aircraft role and engage enemy planes. These varying roles require the aircraft to be able to operate in several flight regimes. For example, the aircraft must be able to operate at speeds below the speed of sound (subsonic), at or near the speed of sound (transonic) and above the speed of sound (supersonic). Moreover, the aircraft must be highly maneuverable at all these speeds, have good handling qualities and be fuel efficient. One critical factor in the ability of the aircraft to meet these varied goals is the design of its wing.

Generally, an aircraft wing is either unswept or swept. An unswept wing, or a wing whose leading edge is approximately perpendicular to the centerline of the fuselage, is typically best suited for aircraft flying at subsonic speeds. Furthermore, the unswept wing allows the aircraft to land on shorter runways such as presented by aircraft carriers and to carry heavier loads.

One problem, however, with the unswept wing is that its transonic and supersonic characteristics are unsatisfactory. This is because, as the speed of the aircraft increases to transonic and supersonic, there is a dramatic increase in drag on the unswept wing preventing the aircraft from accelerating further. In addition, the handling, the control and the stability characteristics of the aircraft are drastically altered. The unswept wing is unable to overcome these undesirable characteristics at transonic and supersonic speeds.

On the other hand, a swept wing is typically best for aircraft flying at transonic or supersonic speeds. A swept wing is a wing whose leading edge is at an angle to the fuselage centerline. The swept wing, having a low wave drag and a low aspect ratio, allows an aircraft to fly efficiently at transonic and supersonic speeds. Moreover, a swept wing allows the aircraft to penetrate smoothly through the transonic speed regime. Despite these advantages, however, the swept wing is generally less desirable for use at subsonic speeds.

A swept wing can be swept either backward or forward. A backward-sweep wing is characterized by having its wing root located predominately forward of its wing tip. This means that the root of the wing is closer to the front of the aircraft than the tip of the wing. In other words, the backward-sweep wing is swept back away from the direction of flight.

Conversely, a forward-sweep wing is characterized by wing tips that are located predominately ahead of the wing root. This means that the forward-sweep wing is swept forward in the direction of flight. A forward-sweep wing is much less common than the backward-sweep wing because of its unfavorable aeroelastic properties.

One problem with the backward-sweep wing is that a stall tends to occur first at the wing tips and then move inboard toward the wing root. A stall occurs when the air over the wing separates from the wing surface and eventually leads to loss of lift. This wing tip flow separation on a backward-sweep wing causes the aircraft to pitch up. In addition, roll control is lost in a stall since the roll control surfaces are located near the wing tips.

One problem the forward-sweep wing has in common with the backward sweep wing is that they both do not perform well at subsonic speeds. As mentioned previously, a swept wing, whether backward-sweep or forward-sweep, is generally unsatisfactory for flight at subsonic speeds and its operation on short runways or to carry heavy loads is restricted.

Therefore, what is needed is an aircraft capable of subsonic, transonic and supersonic speeds that maintains desirable handling, control and stability characteristics at all these speeds. The aircraft should be capable of landing on short runways, carrying heavy loads, overcoming the increased drag at transonic speeds and flying at supersonic speeds.

What is further needed is an aircraft that will retain roll control in a stall by avoiding wing tip stalls. Additionally, what is further needed is an aircraft that can cruise at transonic and supersonic speeds without unnecessary drag that can increase engine power and fuel requirements. Moreover, a further need is an aircraft that is highly maneuverable at all speeds.

Whatever the merits of existing and the above-mentioned aircraft, they do not achieve the benefits of the present invention.

SUMMARY OF THE INVENTION

To overcome the limitations in the prior art as described above and other limitations that will become apparent upon reading and understanding the present specification, the present invention includes an aircraft with a variable forward-sweep wing. This variable forward-sweep wing is positionable at one of two preferred positions at a time, namely, an essentially unswept position and a full-forward sweep position. The present invention is capable of flying at subsonic, transonic and supersonic speeds and has desirable handling, control and stability characteristics at all these speeds. Furthermore, the present invention is highly maneuverable, retains roll control in a stall by avoiding wing tip stalls and has low drag at transonic and supersonic speeds.

In a preferred embodiment the present invention includes an aircraft with a variable forward-sweep wing and a fuselage with a centerline. The wing is positionable in one of two preferred positions at a time.

One position is an essentially unswept position where the wing is approximately orthogonal to the fuselage centerline. The second position is a full-forward sweep position where the wing has approximately a delta wing planform. Furthermore, in the full-forward second position the trailing edge of the wing in the unswept position becomes the leading edge. In both positions the wing is symmetric about the fuselage centerline. The wing may also be continuously positioned at one position at a time between the essentially unswept position and the full-forward position.

Further, the aircraft includes a deflectable foreplane attached to the fuselage and located forward of the wing near the front of the fuselage. An active control system is used to control the deflectable foreplane. Additionally, the aircraft includes porch flaps attached to the fuselage behind the wing.

In other embodiments, the unswept position trailing edges also may include control surfaces that become leading edge control surfaces when the wing is at or near the full-forward sweep position. In addition, the aircraft may include an anti-divergence system to reduce or eliminate the structural divergence tendency of the forward-sweep wing. Also, the aircraft may have a directional stability and control system and preferably includes a thrust vectoring system. Furthermore, the aircraft preferably includes an engine air inlet.

The present invention may also be implemented as a method for configuring an aircraft for flight in a desired flight regime by utilizing the apparatus described above. The method preferably includes the step of positioning the variable forward-sweep wing in a desired position such that the aircraft can fly optimally in a particular flight regime. The wing can be continuously positioned in one position at a time between the unswept position and the full-forward sweep position. Preferably, the porch flap, the deflectable foreplane, the aileron, the trailing edge flap and the leading edge flap are all positioned in such a manner to assist in controlling and optimizing the aircraft for the desired flight regime. These steps can be repeated whenever the flight regime changes.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1A:
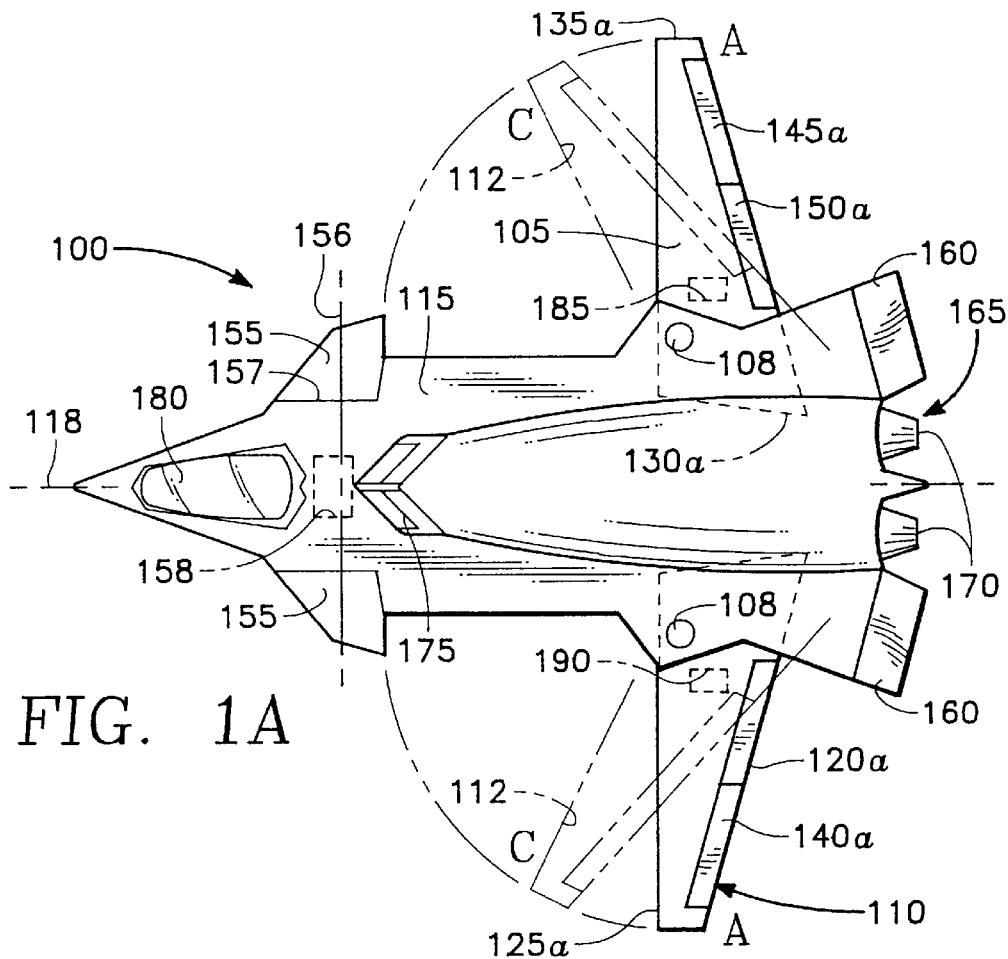
FIG. 1A is a top plan view of an aircraft showing a variable forward-sweep wing of the present invention in an essentially unswept position and the phantom lines showing the wing in some intermediate sweep position.

In the following detailed description of the preferred embodiment, reference is made to the accompanying drawings in which is shown by way of illustration a specific embodiment whereby the invention may be practiced. It is to be understood that other embodiments may be utilized and structural changes may be made without departing from the scope of the present invention.

I. Introduction

As shown in the drawings for purposes of illustration, the present invention is embodied in an aircraft that includes a variable forward-sweep wing. The wing is positionable at one of two positions at a time, namely, at an essentially unswept position and at a full-forward sweep position. Existing swept-wing aircraft have either fixed backward-sweep or fixed forward-sweep wings or have wings with extremely limited variable sweep capabilities. Both types of existing aircraft lack the fully variable forward-sweep capability of the present invention.

An aircraft according to the present invention includes a variable forward-sweep wing with an essentially unswept position and a full-forward sweep position. At the essentially unswept position, the leading edge of the wing is approximately orthogonal to a fuselage centerline of the aircraft. At the full-forward sweep position, the planform approximates a delta wing planform. Furthermore, at the full-forward sweep position the essentially unswept position trailing edge becomes the leading edge.

The aircraft of the present invention is capable of flight over a wide range of flight regimes. In particular, the wing of the aircraft can be configured in an infinite number of positions such that the aircraft is capable of efficient flight at subsonic, transonic and supersonic speeds. Moreover, the wing can be changed as the desired flight regime changes. In addition, the aircraft has the further advantages of a forward-sweep wing including lower drag, greater maneuverability at all speeds, better handling at low speeds, excellent control response at high angles of attack and better stall characteristics including high angle of attack roll control in the stall by the avoidance of wing tip stalls.

II. Structure of the Invention

Figure 1B:
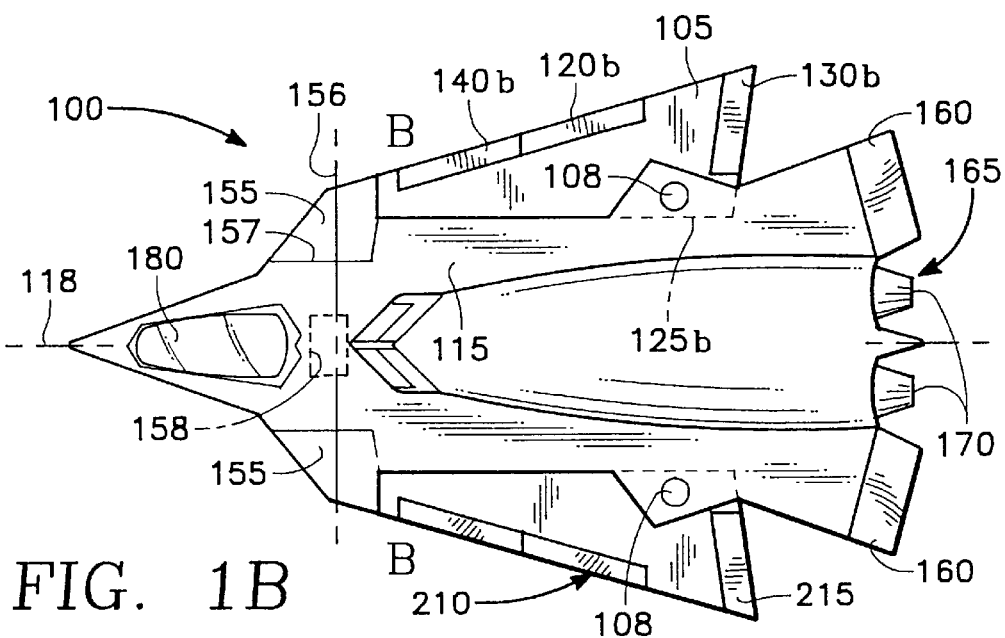
FIG. 1B is a top plan view of the aircraft of FIG. 1A showing the variable forward-sweep wing in a full-forward sweep position.
Figure 1C:
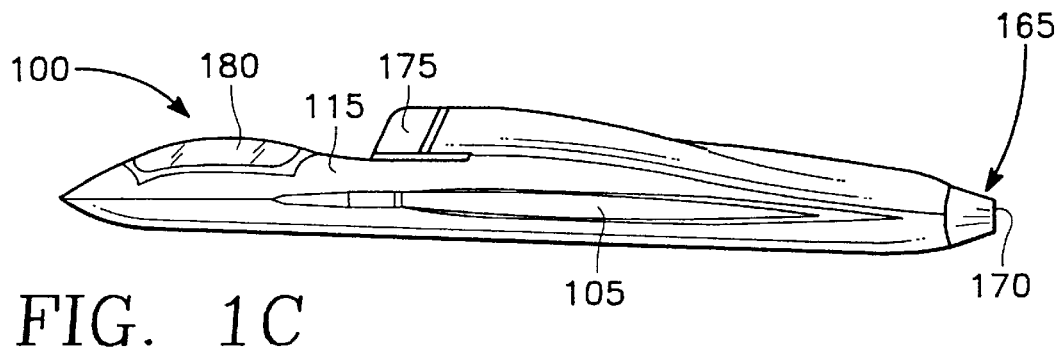
FIG. 1C is a side view of the aircraft of FIGS. 1A and 1B showing the preferred embodiment.

FIGS. 1A, 1B and 1C illustrate the present invention including an aircraft 100 with a new variable forward-sweep wing 105. The aircraft 100 also includes a fuselage 115 having a centerline 118, a deflectable foreplane 155 and an active control system 158. Furthermore, the aircraft 100 contains an engine air inlet 175, a porch flap 160, an engine 165, a thrust vectoring system 170 and an anti-divergence system 185 including an adaptive wing twist control system 190.

The new variable forward-sweep wing 105 is positionable in at least two positions. A change in sweep position is accomplished by rotating the wing 105 about a wing pivot 108 having approximately a vertical axis of rotation. FIG. 1A shows the wing 105 in an unswept position ("Position A") 110. In Position A 110, a leading edge 125a of the wing 105 is approximately orthogonal to the centerline 118. Moreover, the aircraft 100 with the wing 105 in Position A 110 is generally best suited for flight at subsonic speeds.

FIG. 1B illustrates the wing 105 in a full-forward sweep position ("Position B") 210. In Position B 210, the wing 105 approximates a delta wing planform. Furthermore, the aircraft 100 with the wing 105 in Position B 210 is typically best suited for flight at transonic and supersonic speeds. Moreover, Position B 210 is preferred for low-altitude, subsonic flight because its low aspect ratio provides good ride qualities in turbulent air.

The wing 105 is infinitely and continuously positionable in one position at a time between the extreme positions of Position A 110 and Position B 210. FIG. 1A illustrates, using phantom lines, the wing 105 in some intermediate forward-sweep position ("position C") 112 that lies between Position A 110 and Position B 210.

Referring to FIG. 1A, a top plan view of the aircraft 100 shows the variable forward-sweep wing 105. The wing 105 in Position A 110 is bounded by a trailing edge 120a, a leading edge 125a, a root chord 130a and a wing tip 135a. In addition, the trailing edge 120a includes a control surface 140a for controlling the pitch and roll of the aircraft 100 and for increasing its lift at low speeds. The control surface 140a may be split between an aileron 145a and a trailing edge flap 150a.

When the wing 105 is in Position A 110 the root chord 130*a* is preferably hidden inside the aircraft 100. In Position B 210, the root chord 130*a* becomes the trailing edge 130*b* and is no longer hidden inside the aircraft 100 but is exposed to the airstream. In addition, the trailing edge 130*b* may include a trailing edge control surface 215 for providing roll control. This trailing edge control surface 215 is generally deactivated when the wing 105 is in Position A 110.

The deflectable foreplane 155 is attached to the fuselage 115 at a location ahead of the wing 105. The foreplane 155 is deflectable about a foreplane axis 156 that is essentially perpendicular to the centerline 118. The foreplane axis 156 may be located anywhere along the juncture 157 between the foreplane 155 and the fuselage 115. Typically, there are two deflectable foreplanes 155 for providing pitch and roll control of the aircraft 100. Additionally, the aircraft 100 contains the active control system 158 for computerized control of the deflectable foreplanes 155 and of all other control surfaces.

The porch flaps 160 are attached to the rear of the fuselage 115 and behind the wing 105 and also provide pitch and roll control of the aircraft 100. The engine 165 is located at the rear of the aircraft 100 and furnishes thrust. The aircraft 100 may contain at least one of the engines 165. Preferably, the thrust vectoring system 170 is included and gives the aircraft 100 longitudinal and directional control by adjusting the direction of engine thrust. The engine air inlet 175 is preferably located on top of the fuselage 115 behind the cockpit 180 and channels air into each engine 165. In general, there is one engine air inlet 175 for each engine 165.

Although the preferred embodiment includes a cockpit 180, it should be understood that the cockpit 180 is optional and that the aircraft 100 may be unmanned. If the aircraft 100 is unmanned, the cockpit 180 would not be present.

The present invention also includes several ways in which directional stability and control of the aircraft 100 can be accomplished. Preferably, the aircraft includes a thrust vectoring system 170 to provide at least some of the directional stability and control of the aircraft 100. Moreover, the aircraft 100 may include a directional stability and control surface. Those with ordinary skill in the art can appreciate that there are numerous ways and variations to provide this directional stability and control using a directional stability and control surface. For example, an all-movable vertical tail where the whole tail is the control surface, a vertical tail where only a portion of the tail is the control surface and variations of these two techniques whereby one or more tails are not vertical but canted to one side or another. This list is not exhaustive and those with ordinary skill in the art would recognize other ways to accomplish directional stability and control of the aircraft 100.

The anti-divergence system 185 is preferably included in the aircraft 100. This system 185 is used to prevent any structural divergence of the wing 105 inherent in forward-sweep wings.

The anti-divergence system 185 preferably includes a composite wing structure having fibers oriented so that coupling between bending and torsional deflections is reduced. In addition, the anti-divergence system 185 may include the adaptive wing twist control system 190. One technique of the adaptive wing twist control system 190 is to automatically sense wing twist as it occurs and use appropriate control surface deflections or an internal counter-torque-producing device to cancel the twisting effects.

FIG. 1B is a top plan view of the aircraft 100 of FIG. 1A showing the variable forward-sweep wing 105 in Position B 210. In this Position B 210 the wing 105 is bounded by a leading edge 120*b*, a trailing edge 130*b* and a root edge 125*b*.

Significantly, in Position B 210 the leading edge 125*a* of Position A 110 becomes the root edge 125*b* and contacts the fuselage 115. Likewise, as the wing 105 is moved forward the trailing edge 120*a* of Position A 110 becomes the leading edge 120*b* of Position B 210. Similarly, the root edge 130*a* of Position A 110 becomes the trailing edge 130*b* of Position B 210. The wing tip 135*a* of Position A 110 becomes a contiguous surface with the deflectable foreplane 155 in Position B 210.

The wing 105 in Position B 210 includes a leading edge flap 140*b*. Note that the leading edge flap 140*b* in Position B 210 is identical to the control surface 140*a* in Position A 110.

FIG. 1C is a side view of the aircraft 100 of FIGS. 1A and 1B showing the preferred embodiment of the engine air inlet 175 attached to the top of the fuselage 115 and the thrust vectoring system 170. The engine air inlet 175 is attached to the top of the fuselage 115 preferably at a location behind the cockpit 180. One reason this location for the air inlet 175 is preferred is because this position gives the aircraft 100 an increased weapons and payload capacity.

It will be appreciated by those of ordinary skill in the art that the engine air inlet 175 can be located virtually anywhere on the aircraft 100. For example, the engine air inlet 175 may be located anywhere above the fuselage 115, below the fuselage 115 and on the side of the fuselage 115. This list is by no means exhaustive, and it should be understood that those with ordinary skill in the art would recognize other locations for the engine air inlet 175.

Figure 2:
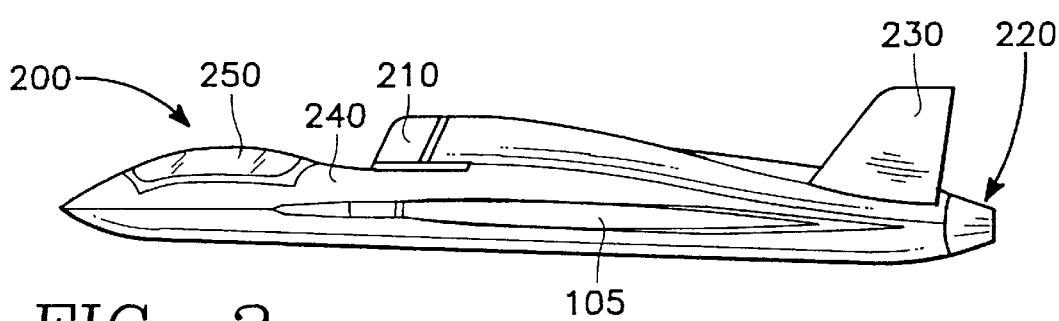
FIG. 2 is an alternate embodiment of the invention showing a side view of an aircraft using the wing of FIGS. 1A and 1B.

FIG. 2 is an alternate embodiment of the invention showing a side view of an aircraft 200 using the variable forward-sweep wing 105 of FIGS. 1A, 1B and 1C. The aircraft 200 includes a top-mounted engine air inlet 210 for directing air into an engine 220. The engine air inlet 210 is located on top of a fuselage 240 and behind a cockpit 250. Moreover, the aircraft 200 has a directional stability and control surface 230 located on top of the fuselage 240 near the rear of the aircraft 200 for providing directional stability and control to the aircraft 200.

Figure 3:
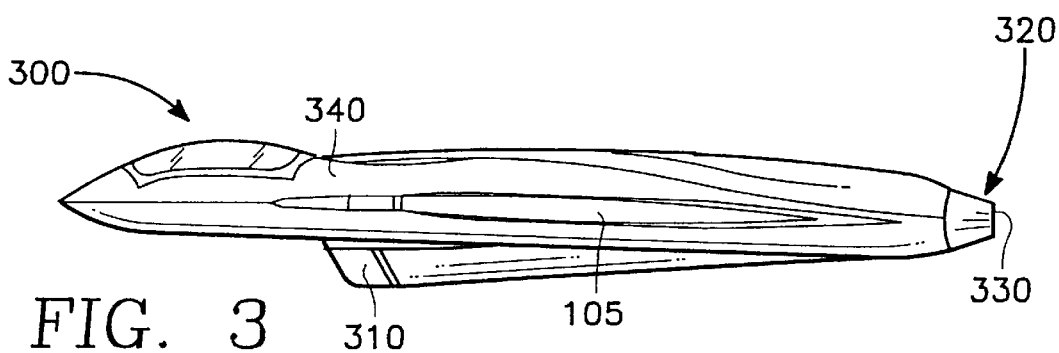
FIG. 3 is another alternate embodiment of the invention showing a side view of an aircraft using the wing of FIGS. 1A and 1B.

FIG. 3 is an alternate embodiment of the invention showing a side view of an aircraft 300 using the wing 105 of FIGS. 1A, 1B and 1C. The aircraft 300 includes a bottom-mounted engine air inlet 310 for directing air into an engine 320. The engine air inlet 310 is positioned on the bottom of a fuselage 340. In addition, the aircraft 300 includes a thrust vectoring system 330 that provides directional control to the aircraft 300 by changing the direction of engine thrust.

In FIGS. 1C, 2, and 3 the wing 105 is shown located in the middle of the fuselage 115. Alternate wing locations may include an above the fuselage 115 (high) position or a below the fuselage 115 (low) position. Additionally, a multitude of intermediate positions on the fuselage 115 are available. The position of the foreplane 155 is dependent on the location of the wing 105 such that the foreplane 155 remains in longitudinal alignment with the wing 105.

As will be recognized by those with ordinary skill in the art, numerous additional aircraft configurations can be created by the combinations of various elements of the invention including the air inlet position, the directional stability and control surface configuration and the thrust vectoring system.

III. Operation of the Invention

The aircraft of the present invention is extremely versatile and can be used in a variety of flight regimes. Specifically, the variable forward-sweep wing can be positioned such that the aircraft is capable of flight at subsonic, transonic and supersonic speeds. In addition, because the wing is a forward-sweep wing and the sweep of the wing increases as the wing is moved forward, the aircraft has all the aforementioned advantages of a forward-sweep wing.

FIGS. 1A and 1B illustrate the two extreme positions of the new variable forward-sweep wing 105 of the present invention. Specifically, FIG. 1A shows the wing 105 at one of these position, namely, Position A 110. In Position A 110, the leading edge 125a of the wing 105 is approximately orthogonal to the centerline 118 of the fuselage 115. In Position A 110, the aircraft 100 is best suited for flight at subsonic speeds, for carrying heavy loads and for landing on shorter runways.

FIG. 1B shows the wing 105 at the other extreme position, Position B 210. In Position B 210, the wing 105 has approximately a delta wing planform. Moreover, in Position B 210 the wing 105 has the characteristics of a sharp-edged delta wing, including low wave drag and the generation of vortex lift. It is best suited for supersonic flight, for transonic maneuvering flight and for low-altitude, subsonic flight because its low aspect ratio provides good ride qualities in turbulent air.

This delta wing planform includes the classical triangle shape planform as well as any other variation. For example, as shown in FIG. 1B, the planform of the wing 105 is a slight modified delta wing shape. This is because the deflectable foreplane 155 tends to truncate the traditional delta wing apex. Moreover, in Position B 210 the trailing edge 130b is not exactly orthogonal to the fuselage 115 as in a true delta wing planform. Nevertheless, for purposes of this specification, a delta wing planform includes these and other planforms approximating a delta wing shape.

As shown in FIGS. 1A and 1B, as the wing 105 moves from Position A 110 to Position B 210 the boundaries of the wing 105 change location. More specifically, as the wing 105 moves from Position A 110 to Position B 210, the trailing edge 120a becomes the leading edge 120b, the leading edge 125a becomes the root edge 125b, the root chord 130a becomes the trailing edge 130b and the wing tip 135a becomes a contiguous surface with the deflectable foreplane 155. These transformations occur when the wing 105 is positioned at or near Position B 210.

When the wing 105 changes from Position A 110 to Position B 210 the control surfaces at various locations on the wing 105 also change their position and function. Namely, as the wing 105 moves from Position A 110 to Position B 210, the control surface 140a becomes the leading edge flap 140b. Moreover, the root chord 130a has a trailing edge control surface 215 that becomes usable. Alternatively, any of these control surfaces can serve several other functions as can be appreciated by those with ordinary skill in the art.

The aerodynamic center of the wing 105 also changes as the sweep is increased. This aerodynamic center travel is alleviated by the presence of the deflectable foreplane 155. As mentioned above, at Position B 210 this deflectable foreplane 155 forms an apex of the delta wing planform and becomes a contiguous surface with the wing 105.

The wing 105 can also be positioned between the extreme positions of Position A 110 and Position B 210. FIG. 1A illustrates, in phantom lines, the wing 105 in Position C 112 which is only one of an infinite number of positions possible between Position A 110 and Position B 210. As shown in FIG. 1A, Position C 112 illustrates what happens when the wing 105 is moved to some position slightly forward of Position A 110.

The sweep of the wing 105 also increases as the wing 105 is moved forward. Accordingly, at Position A 110 there is virtually no sweep while the sweep increases as the wing 105 is moved forward. The sweep continues to increase as the wing 105 is moved forward until Position B 210 is reached.

The position of the wing 105 may be changed in flight by rotating the wing 105 about the wing pivot 108. This allows the aircraft 100 to remain optimally configured over a variety of flight regimes as the flight regime varies.

The present invention may also be implemented as a method of configuring the aircraft of the present invention for flight in a desired flight regime by utilizing the apparatus described above. The method preferably includes moving the variable forward-sweep wing 105 to a desired position between Position A 110 and Position B 210 such that the aircraft 100 is configured for a desired flight regime.

Preferably, if the wing 105 is in Position A 110 the porch flap 160, the deflectable foreplane 155, the aileron 145a and the trailing edge flap 150a are all positioned in such a manner as to optimally configure the aircraft 100 for the desired flight regime. Furthermore, with the wing 105 in Position B 210, the porch flap 160, the deflectable foreplane 155 and the leading edge flap 140b are similarly adjusted to optimize the aircraft 100. These steps can be repeated in flight as needed whenever the flight regime changes.

From the foregoing it will be appreciated that the aircraft and the variable forward-sweep wing of the present invention offers numerous advantages. In particular, the aircraft of the present invention is extremely versatile and capable of flight over a wide range of flight regimes because the variable forward-sweep wing can be configured for optimal flight at subsonic, transonic and supersonic speeds, at cruise and maneuvering flight conditions and for flight at low and high altitudes. Moreover, the wing can be changed in-flight as the desired flight regime changes. In addition, the aircraft has the further advantages of a forward-sweep wing including lower drag, greater maneuverability at all speeds, better handling at low speeds, excellent control response at high angles of attack and better stall characteristics including retention of roll control in a stall due to the avoidance of wing tip stalls. Thus, the aircraft of the present invention has increased versatility and effectiveness over a wide variety of flight regimes and missions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An aircraft, comprising:
   a fuselage having a centerline;
   a deflectable foreplane attached to said fuselage;
   a porch flap attached to said fuselage;
   a variable forward-sweep wing attached to said fuselage and continuously positionable at any one of a number of positions at a time, said number of positions lying between two positions of said wing, said two positions comprising:
   (a) an upswept first positioned wing having a first leading edge, and whereby said first leading edge is approximately orthogonal to said centerline; and
   (b) a full-forward sweep second positioned wing having approximately a delta wing planform.

2. The invention as set forth in claim 1, wherein:
said variable forward-sweep wing in said upswept first position further comprises:
  a first trailing edge with a first control surface;
  said variable forward-sweep wing in said full-forward sweep second position further comprises:
   a second leading edge that becomes said first trailing edge when said variable forward-sweep wing is approximately in said upswept first position.

3. The invention as set forth in claim 2, wherein:
said variable forward-sweep wing in said full-forward sweep second position further comprises a second trailing edge with a second control surface.

4. The invention as set forth in claim 3, wherein:
said first control surface comprises:
  an aileron and a trailing edge flap when said variable forward-sweep wing is positioned at approximately said upswept first position; and
  a leading edge flap when said variable forward-sweep wing is positioned at approximately said full-forward sweep second position.

5. The invention as set forth in claim 1, wherein:
said aircraft further comprises an active control system for controlling said deflectable foreplane.

6. The invention as set forth in claim 1, wherein said variable forward-sweep wing further comprises:
an anti-divergence system whereby any structural divergence tendency of said wing is reduced.

7. The invention as set forth in claim 6, wherein:
said anti-divergence system comprises a composite wing structure having fibers oriented such that coupling between bending and torsional deflections is reduced.

8. The invention as set forth in claim 7, wherein:
said anti-divergence system further comprises an adaptive wing twist control system.

9. The invention as set forth in claim 1, wherein:
said aircraft further comprises a directional stability and control system.

10. The invention as set forth in claim 9, wherein:
said directional stability and control system comprises a directional stability and control surface.

11. The invention as set forth in claim 9, wherein:
said directional stability and control system comprises a thrust vectoring system.

12. The invention as set forth in claim 1, wherein:
said aircraft further comprises an engine air inlet.

13. The invention as set forth in claim 12, wherein said engine air inlet is attached to approximately the top of said fuselage.

14. The invention as set forth in claim 12, wherein said engine air inlet is attached to approximately the bottom of said fuselage.

15. An aircraft, comprising:
a fuselage having a centerline;
a variable forward-sweep wing attached to said fuselage and positionable in at least one of two positions at a time, the two positions comprising:
  (a) an upswept first positioned wing having a first leading edge and a first trailing edge with a first control surface, whereby said first leading edge is approximately orthogonal to said centerline;
  said upswept first positioned wing further having a root edge hidden inside said aircraft;
  (b) a full-forward sweep second positioned wing having a second leading edge that becomes said first trailing edge when said variable forward-sweep wing is positioned at approximately said upswept first position; and
  said full-forward sweep second positioned wing further having a second trailing edge with a second control surface that becomes said root edge when said variable forward-sweep wing is positioned at approximately said upswept first position;
  whereby said variable forward-sweep wing in said upswept first position or in said full-forward sweep second position is symmetric with respect to said centerline.

16. The invention as set forth in claim 15, wherein:
said first control surface comprises:
  an aileron and a trailing edge flap when said variable forward-sweep wing is positioned approximately at said upswept first position; and
  a leading edge flap when said variable forward-sweep wing is positioned approximately at said full-forward sweep second position.

17. The invention as set forth in claim 15, wherein:
said aircraft further comprises a deflectable foreplane attached to said fuselage; and
said variable forward-sweep wing is continuously positionable at any one of a number of positions at a time, said number of positions lying between said upswept first position and said full-forward sweep second position.

18. The invention as set forth in claim 17, wherein:
said aircraft further comprises an active control system for controlling said deflectable foreplane.

19. The invention as set forth in claim 17, wherein:
said aircraft further comprises a porch flap.

20. The invention as set forth in claim 17, wherein said variable forward-sweep wing further comprises:
an anti-divergence system whereby any structural divergence tendency of said wing is reduced.

21. The invention as set forth in claim 20, wherein:
said anti-divergence system comprises a composite wing structure having fibers oriented such that coupling between bending and torsional deflections is reduced.

22. The invention as set forth in claim 21, wherein:
said anti-divergence system further comprises an adaptive wing twist control system.

23. The invention as set forth in claim 17, wherein:
said aircraft further comprises a directional stability and control system.

24. The invention as set forth in claim 23, wherein:
said directional stability and control system comprises a directional stability and control surface.

25. The invention as set forth in claim 23, wherein:
said directional stability and control system comprises a thrust vectoring system.

26. The invention as set forth in claim 17, wherein:
said aircraft further comprises an engine air inlet.

27. The invention as set forth in claim 26, wherein said engine air inlet is attached to approximately the top of said fuselage.

28. The invention as set forth in claim 26, wherein said engine air inlet is attached to approximately the bottom of said fuselage.

29. A method of configuring an aircraft for flight in a desired flight regime, comprising the steps of:
  (a) positioning a variable forward-sweep wing attached to a fuselage having a centerline at any one of a number of positions at a time, said number of positions lying between two positions of said wing, said two positions comprising:
  (1) an upswept first positioned wing having a first leading edge, whereby said first leading edge is approximately orthogonal to said centerline;
  (2) a full-forward sweep second positioned wing having approximately a delta wing planform;
(b) positioning a deflectable foreplane attached to said fuselage at a desired position whereby a pitch and a roll of said aircraft are controlled; and
(c) positioning a porch flap at a desired position whereby said pitch and said roll of said aircraft are controlled.

30. The invention as set forth in claim 29, wherein:
said variable forward-sweep wing in said upswept first position further comprises:
  a first trailing edge with a first control surface;
  said variable forward-sweep wing in said full-forward sweep second position further comprises:
    a second leading edge that becomes said first trailing edge when said variable forward-sweep wing is approximately in said upswept first position.

31. The invention as set forth in claim 30, wherein:
said variable forward-sweep wing in said full-forward sweep second position further comprises a second trailing edge with a second control surface.

32. The invention as set forth in claim 31, wherein said first control surface comprises:
  an aileron and a trailing edge flap when said variable forward-sweep wing is positioned at approximately said upswept first position; and
  a leading edge flap when said variable forward-sweep wing is positioned at approximately said full-forward sweep second position.

33. The invention as set forth in claim 29, further comprising the step of:
  operating said deflectable foreplane with an active control system.

34. The invention as set forth in claim 29, further comprising the step of:
  reducing any structural divergence tendency of said variable forward-sweep wing with an anti-divergence system.

35. The invention as set forth in claim 34, wherein said anti-divergence system further comprises a composite wing structure having fibers oriented such that coupling between bending and torsional deflections is reduced.

36. The invention as set forth in claim 35, wherein said anti-divergence system further comprises an adaptive wing twist control system.

37. The invention as set forth in claim 29, further comprising the step of:
  controlling directional stability and control of said aircraft with a directional stability and control system.

38. The invention as set forth in claim 37, wherein said directional stability and control system is a directional stability and control surface.

39. The invention as set forth in claim 37, wherein said directional stability and control system is a thrust vectoring system.

40. An aircraft comprising:
a fuselage;
a variable forward-sweep wing attached to said fuselage and continuously positionable at any one of a number of positions at a time, said number of positions lying between an upswept first position and a full-forward sweep second position of said wing, thereby allowing said wing to be optimally configured over a plurality of flight regimes as said flight regime varies.

41. The invention as set forth in claim 40, wherein:
said variable forward-sweep wing in said upswept first position further comprises:
a first leading edge;
said variable forward-sweep wing in said full-forward sweep second position further comprises:
  said full-forward sweep second position having approximately a delta wing planform.

42. The invention as set forth in claim 41, wherein:
said variable forward-sweep wing in said upswept first position further comprises:
a first trailing edge;
said variable forward-sweep wing in said full-forward sweep second position further comprises:
  a second leading edge that becomes said first trailing edge when said variable forward-sweep wing is approximately in said upswept first position.

43. The invention as set forth in claim 42, wherein:
said variable forward-sweep wing in said full-forward sweep second position further comprises a second trailing edge;
said first trailing edge comprises a first control surface; and
said second trailing edge comprises a second control surface.

44. The invention as set forth in claim 43, wherein:
said first control surface comprises:
  an aileron and a trailing edge flap when said variable forward-sweep wing is positioned at approximately said upswept first position; and
  a leading edge flap when said variable forward-sweep wing is positioned at approximately said full-forward sweep second position.

45. The invention as set forth in claim 40, wherein:
said aircraft further comprises a deflectable foreplane attached to said fuselage.

46. The invention as set forth in claim 45, wherein:
said aircraft further comprises an active control system for controlling said deflectable foreplane.

47. The invention as set forth in claim 45, wherein:
said aircraft further comprises a porch flap.

48. The invention as set forth in claim 45, wherein said variable forward-sweep wing further comprises:
an anti-divergence system whereby any structural divergence tendency of said wing is reduced.

49. The invention as set forth in claim 48, wherein:
said anti-divergence system comprises a composite wing structure having fibers oriented such that coupling between bending and torsional deflections is reduced.

50. The invention as set forth in claim 49, wherein:
said anti-divergence system further comprises an adaptive wing twist control system.

51. The invention as set forth in claim 40, wherein:
said aircraft further comprises a directional stability and control system.

52. The invention as set forth in claim 51, wherein:
said directional stability and control system comprises a directional stability and control surface.

53. The invention as set forth in claim 51, wherein:
said directional stability and control system comprises a thrust vectoring system.

54. The invention as set forth in claim 40, wherein:

said aircraft further comprises an engine air inlet.

55. The invention as set forth in claim 54, wherein said engine air inlet is attached to approximately the top of said fuselage.

56. The invention as set forth in claim 54, wherein said engine air inlet is attached to approximately the bottom of said fuselage.

57. An aircraft, comprising:

(a) a fuselage;

(b) a variable forward-sweep wing attached to said fuselage and positionable in at least one of two positions at a time, said two positions comprising:

(i) an upswept first positioned wing having a first leading edge and a first trailing edge with a first control surface;

(ii) said upswept first positioned wing further having a root edge hidden inside said aircraft;

(iii) a full-forward sweep second positioned wing having a second leading edge that becomes said first trailing edge when said variable forward-sweep wing is positioned at approximately said upswept first position; and, (iv) said full-forward sweep second positioned wing further having a second trailing edge with a second control surface that becomes said root edge when said variable forward-sweep wing is positioned at approximately said upswept first position.

58. The invention as set forth in claim 57, wherein said first control surface comprises:

an aileron and a trailing edge flap when said variable forward-sweep wing is positioned approximately at said upswept first position; and a leading edge flap when said variable forward-sweep wing is positioned approximately at said full-forward sweep second position.

59. The invention as set forth in claim 57, wherein:

said aircraft further comprises a deflectable foreplane attached to said fuselage; and said variable forward-sweep wing continuously positionable at any one of a number of positions at a time, said number of positions lying between said upswept first position and said full-forward sweep second position.

60. The invention as set forth in claim 59, wherein:

said aircraft further comprises an active control system for controlling said deflectable foreplane.

61. The invention as set forth in claim 59, wherein:

said aircraft further comprises a porch flap.

62. The invention as set forth in claim 59, wherein said variable forward-sweep wing further comprises:

an anti-divergence system whereby any structural divergence tendency of said wing is reduced.

63. The invention as set forth in claim 62, wherein:

said anti-divergence system comprises a composite wing structure having fibers oriented such that coupling between bending and torsional deflections is reduced.

64. The invention as set forth in claim 63, wherein:

said anti-divergence system further comprises an adaptive wing twist control system.

65. The invention as set forth in claim 59, wherein:

said aircraft further comprises a directional stability and control system.

66. The invention as set forth in claim 65, wherein:

said directional stability and control system comprises a directional stability and control surface.

67. The invention as set forth in claim 65, wherein:

said directional stability and control system comprises a thrust vectoring system.

68. The invention as set forth in claim 59, wherein:

said aircraft further comprises an engine air inlet.

69. The invention as set forth in claim 68, wherein said engine air inlet is attached to approximately the top of said fuselage.

70. The invention as set forth in claim 68, wherein said engine air inlet is attached to approximately the bottom of said fuselage.

\* \* \* \* \*